United States Patent
Christensen et al.

(10) Patent No.: US 9,971,393 B2
(45) Date of Patent: May 15, 2018

(54) DYNAMIC WORKLOAD FREQUENCY OPTIMIZATION

(71) Applicant: International Business Machines Corporation, Armonk, NY (US)

(72) Inventors: Bjorn P. Christensen, Round Rock, TX (US); Victor Zyuban, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 14/970,716

(22) Filed: Dec. 16, 2015

(65) Prior Publication Data

US 2017/0177064 A1    Jun. 22, 2017

(51) Int. Cl.
  *G06F 1/32* (2006.01)
  *G06F 9/30* (2006.01)

(52) U.S. Cl.
  CPC ............ *G06F 1/3243* (2013.01); *G06F 1/324* (2013.01); *G06F 9/30145* (2013.01)

(58) Field of Classification Search
  None
  See application file for complete search history.

(56) References Cited

U.S. PATENT DOCUMENTS

| | | | | |
|---|---|---|---|---|
| 2002/0069372 A1* | 6/2002 | Rosch | ........... | G06F 1/08 713/300 |
| 2004/0088592 A1* | 5/2004 | Rizzo | ........... | G06F 1/08 713/322 |
| 2005/0034002 A1* | 2/2005 | Flautner | ........... | G06F 1/3203 713/322 |
| 2005/0283629 A1* | 12/2005 | Tanaka | ........... | G06F 1/04 713/322 |
| 2006/0173665 A1* | 8/2006 | Arndt | ........... | G06F 1/324 703/14 |
| 2009/0019264 A1* | 1/2009 | Correale, Jr. | ........... | G06F 1/08 712/216 |
| 2009/0019265 A1* | 1/2009 | Correale, Jr. | ........... | G06F 1/3203 712/216 |
| 2011/0145605 A1* | 6/2011 | Sur | ........... | G06F 1/206 713/300 |

(Continued)

OTHER PUBLICATIONS

Choi et al., Dynamic Voltage and Frequency Scaling Based on Workload Decomposition, ISLPED 2004, pp. 174-179.

*Primary Examiner* — Jaweed A Abbaszadeh
*Assistant Examiner* — Cheri Harrington
(74) *Attorney, Agent, or Firm* — Lieberman & Brandsorfer, LLC

(57) ABSTRACT

The embodiments described herein relate to dynamically detecting a frequency change condition for microprocessor performance. An instruction is received, and a frequency change condition associated with the received instruction is dynamically detected. A frequency modulation is performed in response to the dynamic detection. The frequency modulation includes selecting a second frequency for optimal instruction processing different from a first frequency, the first frequency being a default operating frequency of the microprocessor. Execution of the instruction is completed at the second frequency. Accordingly, incoming execution instructions are logically analyzed, and the processor frequency is selectively modified based on associated instruction conditions.

12 Claims, 5 Drawing Sheets

(56) References Cited

U.S. PATENT DOCUMENTS

2014/0189377 A1 7/2014 Subbareddy et al.
2016/0147249 A1* 5/2016 Gendler ............... G06F 1/3296
                                                    713/501

* cited by examiner

DYNAMIC WORKLOAD FREQUENCY OPTIMIZATION

BACKGROUND

The embodiments described herein relate to processor design and architecture. More specifically, the embodiments relate to partitioning the processor design for architecturally defined timing domains that influence design cycle time and pipeline depth.

Timing design of a processor is static in that design cycle time is applied uniformly across all circuits within a time domain based on an assumption of equal use. The design cycle time may be determined based on an expected workload of the processor. In one embodiment, the design cycle time is determined based on a thermal design point (TDP) for the processor. As is known in the art, the TDP of a processor is a maximum amount of heat generated by the processor during typical operation. However, many workloads do not approach the TDP of the processor, and as such these workloads may benefit from a faster cycle time.

One known solution for addressing the workload differentiation is accomplished using a critical path monitor (CPM), which is a circuit that measures an available timing margin in real-time, coupling output from the circuit to a clock generation circuit to adjust clock frequency within cycles in response to an excess or inadequate timing margin. The CPM periodically adjusts a processor voltage or frequency. However, the CPM continues to employ a uniform design cycle.

SUMMARY

A microprocessor, a method, and a computer program product are provided to support dynamic optimization of microprocessor performance.

According to one aspect, a microprocessor is provided having components configured to support dynamic optimization of performance. The microprocessor includes an architecture with a time domain partition. More specifically, the architecture has first and second circuits, each in communication with a block. The first circuit is configured to operate at a first frequency, and the second circuit is configured to operate at a second frequency, with the second frequency being different from the first frequency. The first frequency is a default operating frequency. The microprocessor further includes an instruction processing unit that functions to receive an instruction, and dynamically detect a frequency change condition associated with the instruction. In addition, the microprocessor further includes a frequency modulation unit in communication with the control unit. The frequency modulation unit performs a frequency modulation in response to the dynamic detection. More specifically, the frequency modulation unit selects the frequency for optimal instruction processing. An instruction execution unit is provided in communication with the instruction processing unit and functions to complete execution of the instruction at the second frequency.

According to another aspect, a method is provided for supporting dynamic optimization of microprocessor performance. An instruction is received, and a frequency change condition associated with the instruction is dynamically detected. A frequency modulation is performed in response to the dynamic detection. The frequency modulation includes selecting a second frequency for optimal instruction processing, with the second frequency being different from the first or default frequency. In one embodiment, the first frequency is referred to as the default operating frequency. Execution of the instruction is completed at the second frequency.

According to yet another aspect, a computer program product is provided to support dynamic optimization of microprocessor performance. The computer program product includes a computer readable storage device having computer readable program code embodied therewith. The program code is executable by a processor to receive an instruction, and dynamically detect a frequency change condition associated with the instruction. A frequency modulation is performed in response to the dynamic detection, including selecting a second frequency for optimal instruction processing different from a first frequency. The first frequency is a default operating frequency. Execution of the instruction is completed at the second frequency.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments unless otherwise explicitly indicated.

DETAILED DESCRIPTION

Figure 1:
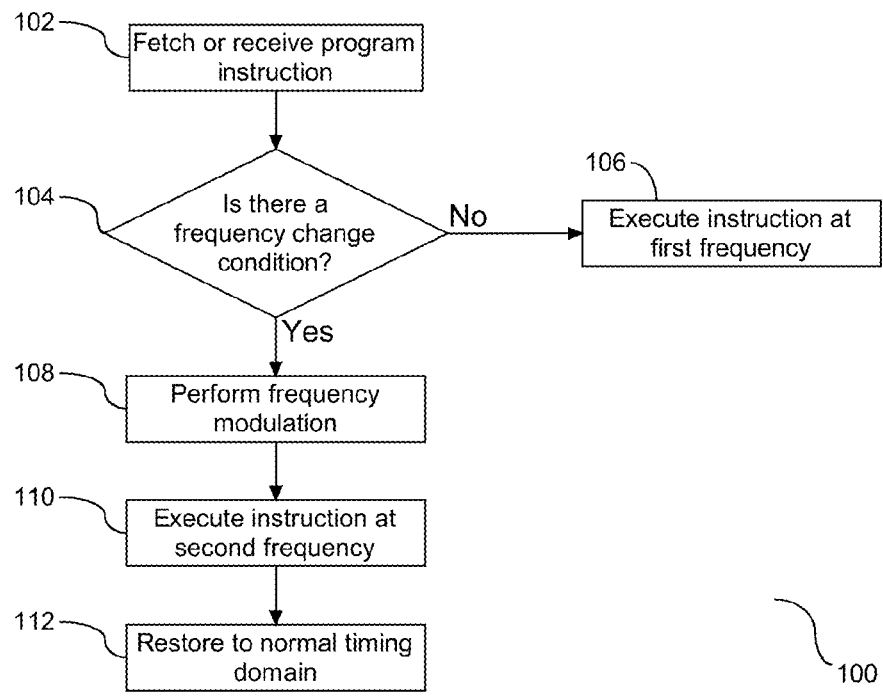
FIG. 1 depicts a flow chart illustrating a process for dynamically optimizing microprocessor performance, according to an embodiment.

It will be readily understood that the components of the present embodiment(s), as generally described and illustrated in the Figures herein, may be arranged and designed in a wide variety of different configurations. Thus, the following detailed description of the embodiments of the apparatus, system, and method of the present embodiment(s), as presented in the Figures, is not intended to limit the scope of the embodiment(s), as claimed, but is merely representative of selected embodiments.

Reference throughout this specification to "a select embodiment," "one embodiment," or "an embodiment" means that a particular feature, structure, or characteristic described in connection with the embodiment is included in at least one embodiment described herein. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiment(s) as claimed herein.

As is known in the art, a central processing unit (CPU), such as a microprocessor, is a device that is configured to execute computer program instructions retrieved from memory. Specifically, a CPU is configured to fetch or receive a program instruction corresponding to a memory address, decode the instruction, and execute the instruction. The instruction is executed by passing the decoded information of the instruction as a sequence of control signals to other components of the CPU for performing the actions dictated by the instruction. In one embodiment, if the instruction has an indirect address, or multilevel address, the CPU is configured to read an effective address of the instruction, and translate the effective address to a real address.

Circuitry within a conventional microprocessor is designed to operate at the same frequency (i.e., same design timing requirement). All timing paths within the microprocessor are held to a standard cycle time. In one embodiment, the standard cycle time may be 500 ps. The detection of frequency change conditions is conventionally done by employing either external or internal critical path monitors associated with the microprocessor, which subsequently change the operating frequency of the microprocessor.

A selected group of circuits of a microprocessor may be specified to operate at a lower frequency, allowing the selected group of circuits to be designed with more power efficient logic or circuit styles and topologies, or with higher threshold transistors to reduce leakage currents. Alternatively, and in on embodiment, the selected group of circuits can be set to operate on a lower voltage domain to reduce power. Because of the less aggressive timing requirements, the selected group of circuits may be designed using fewer resources.

With reference to FIG. 1, a flowchart (100) is provided illustrating a process for dynamically optimizing microprocessor performance. A program instruction is fetched or received (102). In one embodiment, fetching the instruction at step (102) includes reading a memory address associated with the fetched instruction. If the memory address is a direct address, then the address need not be translated to a real address. However, if the address is an indirect address, an address translation is performed, such as an effective-to-real address translation (ERAT) as shown and described in FIGS. 5 and 6.

The microprocessor is configured to operate at a default, referred to herein as a first frequency. For example, in one embodiment, all timing paths may be held to the 500 ps standard. There may be instances where operation of the first frequency is not optimal for execution of the instruction. For example, a particular workload may use a feature that is considerably higher power or requires more time to complete than the 500 ps cycle time. An analysis is performed on the instruction to decide if the frequency should be modified for optimal processing of the instruction. The analysis determines if there is a frequency change condition associated with the instruction (104). The determination at step (104) includes dynamically detecting the frequency change condition. In one embodiment, the dynamic detection at step (104) includes performing a logic analysis of the instruction. In another embodiment, the dynamic detection at step (104) includes performing a logic function of a control signal. Accordingly, the initial aspect of the dynamic optimization includes an assessment of the instruction.

A negative response to the determination at step (104) indicates that the instruction may be optimally processed at the default frequency, i.e. first frequency, and execution of the instruction is completed at the first frequency (106). In other words, in this circumstance there is no frequency modulation for the associated instruction. However, a positive response to the determination at step (104) indicates that a frequency change condition has been detected. In one embodiment, the frequency change condition is an ERAT miss requiring execution of the instruction at a different frequency. Further details regarding the process for detecting an ERAT miss will be provided below in FIGS. 5 and 6.

Following a positive response to the instruction assessment at step (104), a frequency modulation is performed (108). More specifically, the frequency modulation at step (108) includes selecting a second frequency for optimal instruction processing, with the second frequency being different from the first frequency. For example, in one embodiment, the first frequency is a default frequency of 500 ps and the second frequency is 550 ps. Further details regarding the frequency modulation of step (108) will be discussed below with reference to FIGS. 2-4. In one embodiment, a signal is created within the architecture of the microprocessor to identify when the second frequency sub-domain is in use. The signal would be calculated in advance and sent to the critical path monitor's (CPM's) control mechanism(s), where it can change the phase locked loop speed (PLL) in the microprocessor. In one embodiment, the CPM dynamically changes the PLL speed in the system to run at the slowest necessary frequency for any sub-domain in use at the time. Similarly, in one embodiment, the signal may be set to the PLL directly.

After the frequency modulation to the second frequency at step (108), execution of the instruction is completed at the second frequency (110). Upon completion of the workload, the CPM restores the PLL to the full speed of the normal timing domain (112). In one embodiment, the CPM may not be in use and the signal would be communicated directly to the PLL. Accordingly, the process of FIG. 1 dynamically detects a condition indicating that a fetched instruction should be processed at a non-default frequency, and completes execution of the instruction at the non-default frequency.

Figure 2:
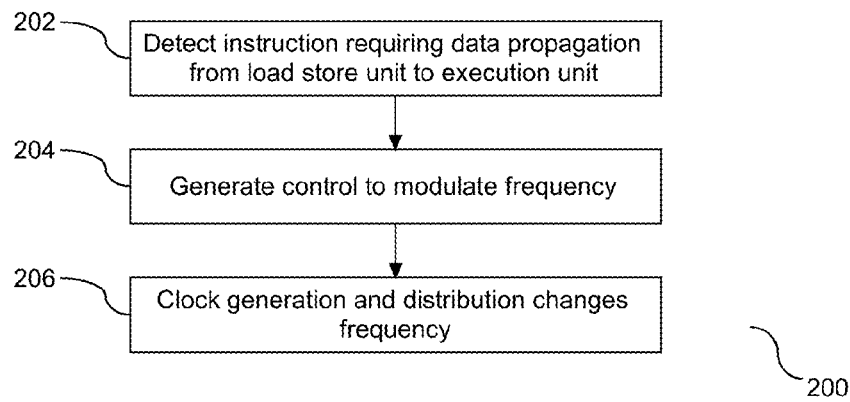
FIG. 2 depicts a flow chart illustrating a process for modulating the frequency of a processor with a removed staging latch, according to an embodiment.

Certain architectural features may benefit from reduced latency, even at a lower operating frequency. With reference to FIG. 2, a flowchart (200) is provided illustrating a process for modulating the frequency of a processor with a removed staging latch. An instruction that requires data propagation from a load store unit to an instruction execution unit is detected (202). As part of the instruction, the signal is sent without a staging latch to insert latency or pipeline depth to the executing instruction(s). A control is generated to lower the frequency from the default frequency, e.g., 500 ps, to the second frequency, e.g., 550 ps, (204). Removal of the staging latch removes overhead. Following step (204), the clock generation and distribution receives the signal and changes the microprocessor frequency (206), allowing the microprocessor subcomponents to execute instructions at the second frequency. Accordingly, as shown herein, a multi-frequency single clock domain microprocessor design is provided.

Figure 3:
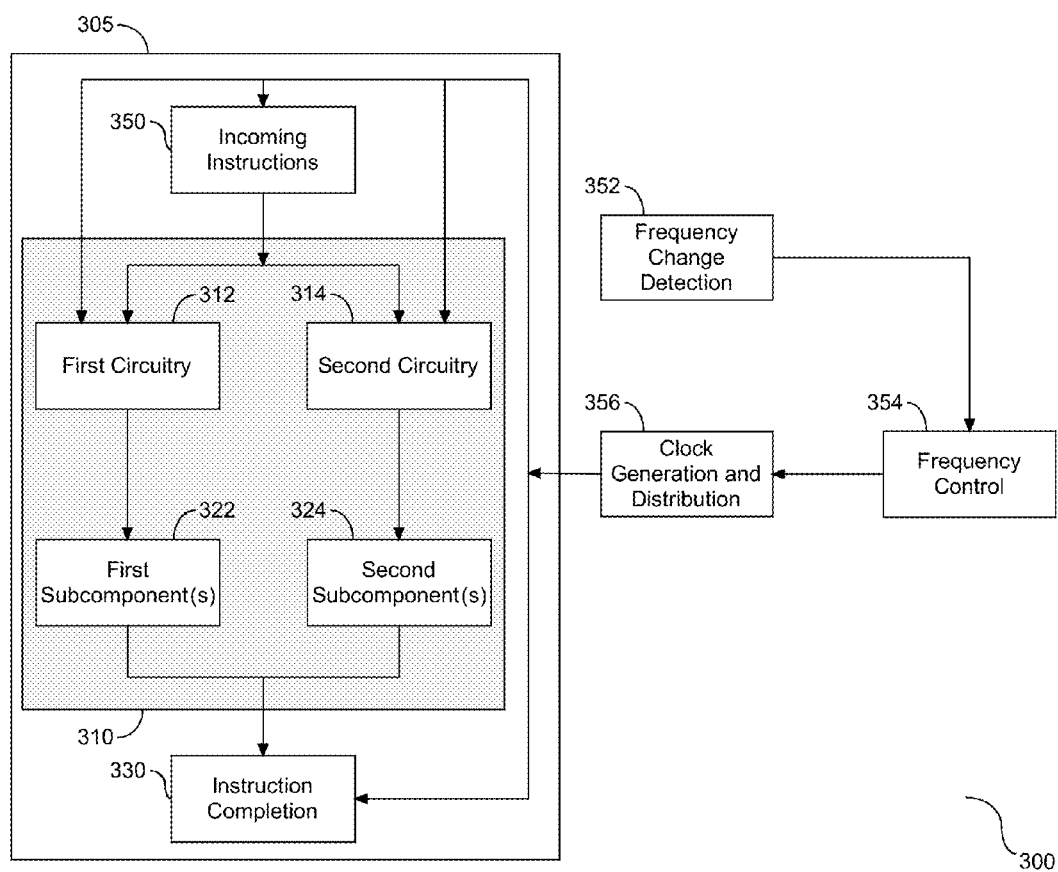
FIG. 3 depicts a block diagram illustrating a microprocessor designed to support dynamic workload frequency optimization, according to an embodiment.

With reference to FIG. 3, a block diagram (300) is provided illustrating a microprocessor (305) designed to support dynamic workload frequency optimization, according to an embodiment. As discussed above, a conventional microprocessor is associated with a standard cycle time of a time-domain. However, a sub-domain of a microprocessor may be created within the microprocessor architecture corresponding to a relaxed cycle time. For example, if the standard cycle time is 500 ps, the relaxed cycle time may be 550 ps (i.e., 10% relief). While in reality the time domain will synchronously operate at a uniform cycle time across the whole domain, the relaxation is created knowing that a control mechanism will slow the cycle time accordingly while in use.

The microprocessor (305) includes a partitioned architecture (310). The partitioned architecture (310) is configured to create such a time-domain partition within the microprocessor (305). As shown, the partitioned architecture (310) includes first circuitry (312) and second circuitry (314) each in communication with a set of sub-components. The first circuitry (312) is in communication with a first set of sub-components (322) configured to operate at the first frequency, and the second circuitry (314) is in communication with a second set of sub-components (324) configured to operate at the second frequency. In one embodiment, the first frequency is a default operating frequency of the microprocessor (305). Similarly, in one embodiment, the second frequency is lower than the first frequency. Thus, the first and second circuitry (312) and (314) of the partitioned architecture (310) create a time domain partition within the microprocessor. Although only first and second circuitry (312) and (314) are shown in FIG. 3, it is to be understood and appreciated that additional circuitry may be provided in alternate embodiments, with each additional circuitry associated with respective operating frequencies.

As shown, incoming instructions are received and analyzed at (350) to determine frequency modulation of the signal and an associated timing circuit and sub-components for processing the instructions. Based on the analysis, in some circumstances, as shown and described in FIGS. 1 and 2, the instruction will require or benefit from a frequency change (352). A frequency control mechanism (354) is activated for frequency modulation, and a clock generation and electrical distribution unit (356) is employed to operate clock changes for the microprocessor frequency. The frequency control mechanism (354) and clock generation and electrical distribution unit (356) may be comprised of any known components in accordance with the embodiments described herein. For example, a switch/multiplexer may be provided in communication with a first reference clock (462a) associated with the first frequency (462) and a second reference clock (464a) associated with the second frequency (464). The frequency is controlled by the switch/multiplexer by toggling between the first and second frequencies, as is known in the art. Other devices and/or techniques may be used to perform the frequency modulation described herein.

The clock changes communicate with all the microprocessor subcomponents. As such, based on the clock changes, a signal is communicated to the first or second set of sub-components (324) and (324), respectively, via the first and second circuits (312) and (324), respectively. In one embodiment, the select sub-components are configured to operate at a set frequency or frequency range. By the clock generation (356) unit changing the frequency, a signal is communicated to the circuit configured to complete execution of the instruction by utilizing the appropriate sub-components. Completion of instruction execution is detected at (330).

Figure 4:
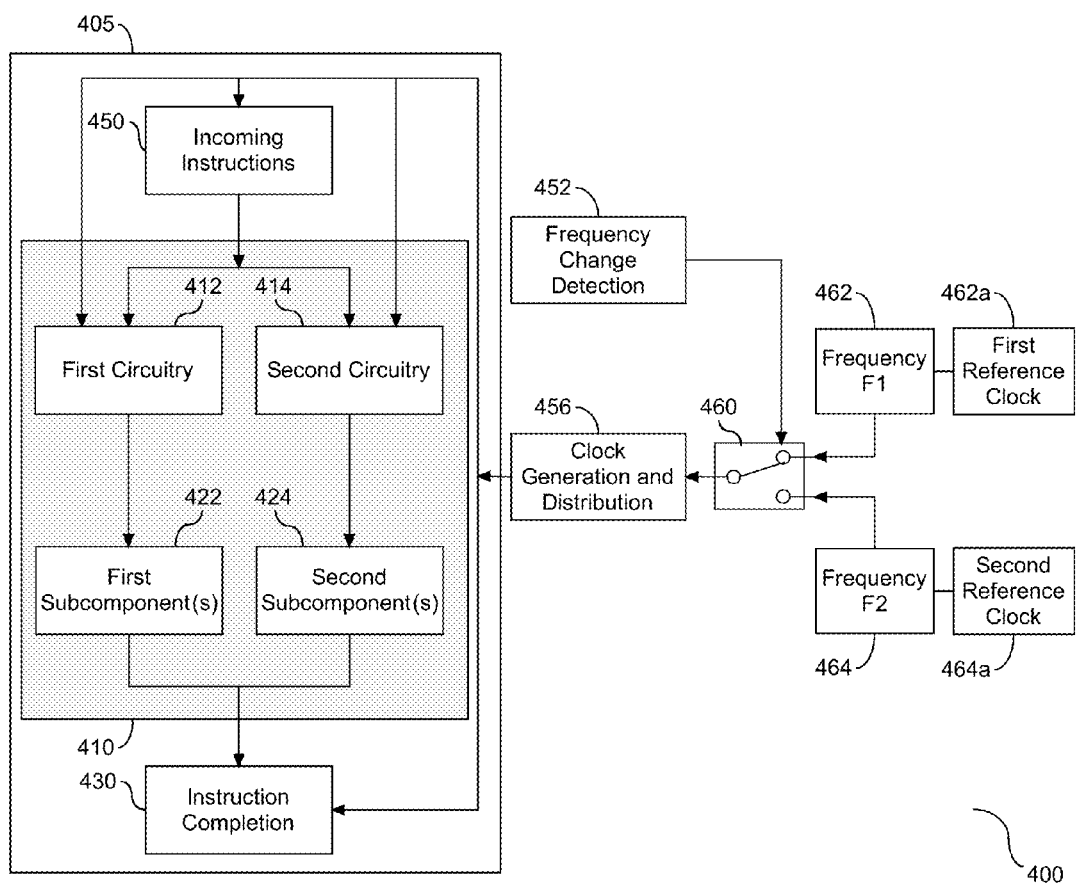
FIG. 4 depicts a block diagram illustrating a microprocessor designed to support dynamic workload frequency optimization, according to an embodiment.

Referring to FIG. 4, a block diagram (400) is provided illustrating a microprocessor (405) designed to support dynamic workload frequency optimization, according to an embodiment. The micro-processor shown at (405) is a variant of the microprocessor shown in FIG. 3, with like numbers representing like parts. As shown, the frequency control mechanism (354) is replaced with a switch (460) to toggle between two frequencies (462) and (464). Based on the frequency selection as dictated by the switch (460), the clock generation and electrical distribution unit (456) is employed to operate clock changes for the microprocessor frequency. In the example shown herein selection of the first frequency (462) will result in the clock distribution (456) initiating a signal to the first circuitry (412), and selection of the second frequency (464) will result in the clock distribution initiating a signal to the second circuitry (414). Accordingly, the frequency is controlled by the switch/multiplexer by toggling between the first and second frequencies.

Figure 5:
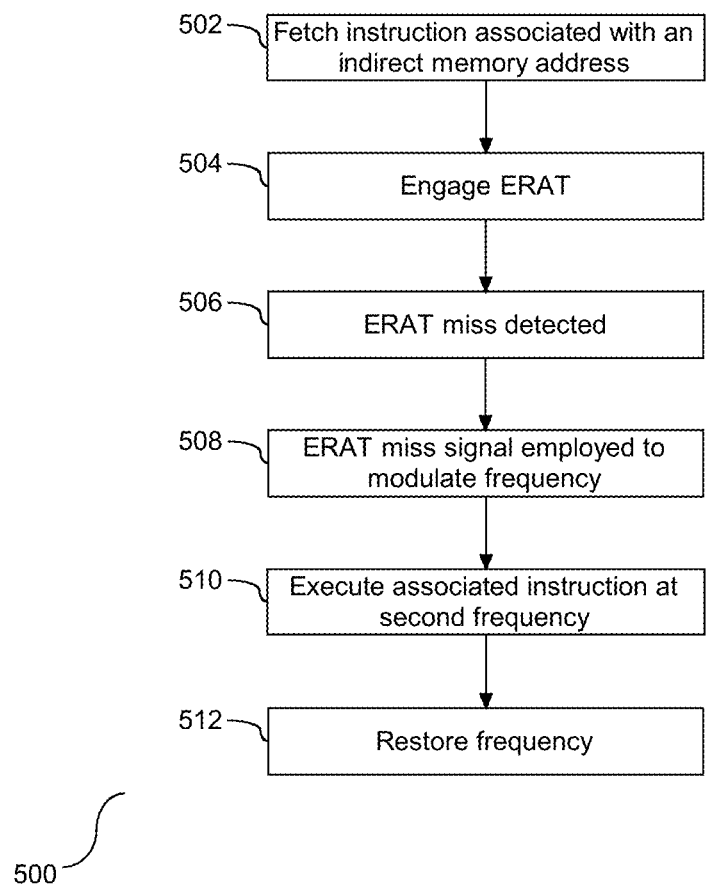
FIG. 5 depicts a flow chart illustrating another embodiment for modulating the frequency of a processor, according to an embodiment.

Referring to FIG. 5, a flow chart (500) is provided illustrating another embodiment for modulating the frequency of a processor. Certain circuits in a microprocessor may be used more than others. Frequency modulation may be tied to circuit categorization. In one embodiment, an instruction category or event may be assigned to specific circuits. Similarly, in one embodiment, address translation logic is designed to operate at a lower frequency. In the majority of operation cycle, the address translation logic is not used since most of the instruction loads get the address translation using an address translation buffer or cache. The process shown herein as directed to an address translation miss. An instruction associated with an indirect memory address is fetched (502), and an ERAT unit is engaged to translate the indirect, e.g. virtual, addresses to real address (504). In response to detection of an address translation miss by the ERAT unit (506), an associated ERAT miss signal is employed to modulate the processor to the second frequency (508), allowing microprocessor sub-components associated with the ERAT to execute the instruction at the second frequency (510). After the instruction associated with the translated address has executed, the frequency is restored (512). Further details with respect to ERAT miss detection will be provided below in FIG. 6. An ERAT miss is one example of an event that may occur that would not be predicted or detected by processing the incoming instruction type and may trigger the need to activate or use the second frequency domain. In one embodiment, the event may activate a circuit to execute the instructions at the second frequency. Accordingly, in this example, the frequency of the microcontroller is modulated to translate an effective address of a program instruction to a real address in response to an ERAT miss.

Figure 6:
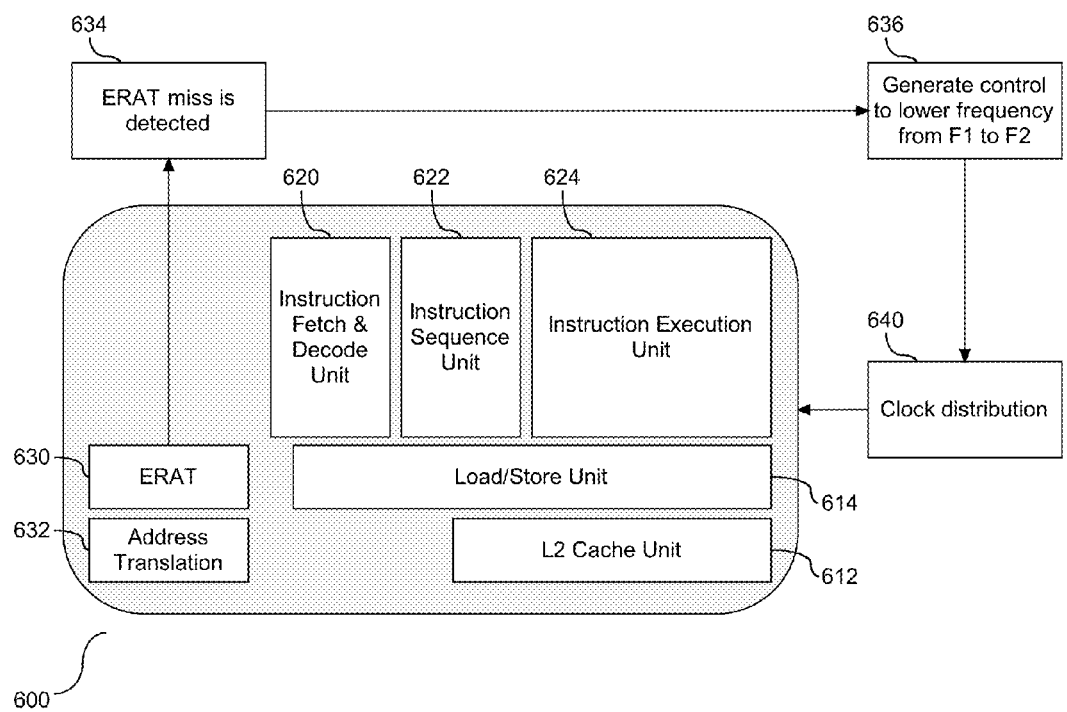
FIG. 6 depicts a block diagram illustrating a multi-frequency microprocessor design, according to an embodiment.

With reference to FIG. 6, a block diagram (600) is provided illustrating a multi-frequency microprocessor design. As shown, the processor is provided with L2 cache (612), and a load/store unit (614). The cache (612) is a memory bank, and the load/store unit (614) is a hardware element that loads data from memory or stores it back to memory from hardware registers (not shown). With respect to instructions, the processor is shown herein with an instruction fetch and decode unit (620), an instruction sequence unit (622), and an instruction execution unit (624). The instruction fetch and decode unit (620) functions to receive an instruction and to translate the received instruction for execution. As described herein, the translation of the instruction may relate to an associated circuit selection and execution frequency. The instruction sequence unit (624) pertains to placing the received instructions in an order. In one embodiment, the sequence may be linear. Similarly, in one embodiment, the order may be interrupted with a branch instruction, which may change the order of execution. The instruction execution unit (624) functions to manage execution of the ordered instructions.

As further shown, the processor is configured with an effective to real-address translation (ERAT) unit (630). As shown and described above, one or more circuits in the process may be event driven or via an instruction category. In such cases, limited portions of the microprocessor are set up to detect events. As shown, herein, the ERAT unit (630) is an example of processor hardware that translates indirect, e.g. virtual, addresses to real address. A signal is generated by the ERAT unit (630) to hardware modulating the processor frequency in response to an ERAT miss. As an instruction is received or fetched by the processor (610), the ERAT unit (630) may detect that an address of the received instruction requires translation, and the address of the instruction is translated (632). In one embodiment, an associated ERAT miss is detected (634), and a control signal is generated (636) to modulate the frequency for the associated instruction to translate the address at the modulated frequency. The control signal is communicated to the clock distribution unit (640), which makes changes to the microprocessor frequency, as shown and described in FIGS. 3 and 4.

The dynamic optimization feature of the microprocessor as shown and described in the flow charts and block diagrams of FIGS. 1-6 allows for operation at the highest performance possible based on constraints or features of the microprocessor workload. One advantage of the frequency modulation is that the fastest speed possible for workload execution is not limited by a "weakest link" in a chain corresponding to certain workloads. Another advantage is that new workloads could have hardware support adopted into the microprocessor design while being less disruptive to the overall design process.

The described features, structures, or characteristics may be combined in any suitable manner in one or more embodiments. In the following description, numerous specific details are provided, such as examples of agents, to provide a thorough understanding of the embodiment(s). One skilled in the relevant art will recognize, however, that the embodiment(s) can be practiced without one or more of the specific details, or with other methods, components, materials, etc. In other instances, well-known structures, materials, or operations are not shown or described in detail to avoid obscuring aspects.

The present embodiment(s) may be a system, a method, and/or a computer program product. The computer program product may include a computer readable storage medium (or media) having computer readable program instructions thereon for causing a processor to carry out aspects of the present embodiment(s).

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiment(s) may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiment(s).

Aspects of the present embodiment(s) are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to the various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiment(s) has been presented for purposes of illustration and description, but is not intended to be exhaustive or limited to the embodiment(s) in the form disclosed. Many modifications and variations will be apparent to those of ordinary skill in the art without departing from the scope and spirit of the embodiment(s). The embodiment was chosen and described in order to best explain the principles and the practical application, and to enable others of ordinary skill in the art to understand the embodiment(s) for various embodiments with various modifications as are suited to the particular use contemplated.

It will be appreciated that, although specific embodiments have been described herein for purposes of illustration, various modifications may be made without departing from the spirit and scope of the invention. Accordingly, the scope of protection of this invention is limited only by the following claims and their equivalents.

We claim:

1. A method comprising:
    receiving an instruction to a microprocessor comprising a partitioned architecture of at least two circuits, each circuit configured to operate at a different frequency comprising at least a first frequency and a second frequency;
    dynamically detecting an address translation miss at the first frequency associated with the received instruction and generating a control signal in response to the detected address translation miss;
    performing a frequency modulation in response to the dynamic detection, including selecting a second circuit different from a first circuit and translating an address associated with the address translation miss at the second frequency, wherein the first circuit is a default circuit operating at the first frequency; and
    completing execution of the received instruction at the second frequency.

2. The method of claim 1, wherein selecting the second circuit comprises activating the second circuit in response to detecting the address translation miss, the activated second circuit to execute the received instruction at the second frequency.

3. The method of claim 1, wherein the dynamic detection of the address translation miss comprises performing a logic analysis of the received instruction.

4. The method of claim 1, wherein the dynamic detection of the address translation miss comprises performing a logic function on a control signal.

5. The method of claim 1, wherein performing the frequency modulation comprises a switch toggling between the first and second frequencies, wherein the switch is in communication with a first reference clock associated with the first frequency and a second reference clock associated with the second frequency.

6. The method of claim 1, wherein performing the frequency modulation comprises a phase locked loop outputting the second frequency.

7. The method of claim 1, further comprising restoring operation to the first circuit at the first frequency in response to the execution of the received instruction.

8. A computer program product comprising a computer readable storage device having program code embodied therewith, the program code executable by a processing unit comprising a partitioned architecture of at least two circuits, each circuit configured to operate at a different frequency comprising at least a first frequency and a second frequency, the processing unit to:
    receive an instruction;
    dynamically detect an address translation miss at the first frequency associated with the received instruction and generate a control signal in response to the detected address translation miss;
    perform a frequency modulation in response to the dynamic detection, including selecting a second circuit different from a first circuit and translate an address associated with the address translation miss at the second frequency, wherein the first circuit is a default circuit operating at the first frequency; and complete execution of the received instruction at the second frequency.

9. The computer program product of claim 8, further comprising program code to activate the second circuit in response to detecting the address translation miss, the activated second circuit to execute the received instruction at the second frequency.

10. The computer program product of claim 8, wherein the dynamic detection of the address translation miss comprises program code to perform a logic analysis of the received instruction.

11. The computer program product of claim 8, wherein the dynamic detection of the address translation miss comprises program code to perform a logic function on a control signal.

12. The computer program product of claim 8, further comprising program code to restore operation to the first circuit at the first frequency in response to the execution of the received instruction.

\* \* \* \* \*